(12) United States Patent
Simoni

(10) Patent No.: US 7,320,394 B2
(45) Date of Patent: Jan. 22, 2008

(54) BLOCK SORTING SYSTEM AND METHOD

(76) Inventor: Selvino Simoni, Via Barabana 49, Selva Malvezzi, 40060 Molinella Bologna (IT)

( * ) Notice: Subject to any disclaimer, the term of this patent is extended or adjusted under 35 U.S.C. 154(b) by 246 days.

(21) Appl. No.: 11/261,148

(22) Filed: Oct. 27, 2005

(65) Prior Publication Data

US 2007/0095631 A1 May 3, 2007

(51) Int. Cl.
*B65G 47/26* (2006.01)

(52) U.S. Cl. .................................. 198/432; 198/468.2

(58) Field of Classification Search ................ 198/358, 198/426, 427, 429, 432, 468.2, 468.6
See application file for complete search history.

(56) References Cited

U.S. PATENT DOCUMENTS

| | | | |
|---|---|---|---|
| 5,017,075 A * | 5/1991 | Block | 198/468.2 |
| 5,527,371 A * | 6/1996 | Nakagawa et al. | 198/432 |
| 6,722,836 B2 * | 4/2004 | Jager | 198/358 |
| 6,948,608 B2 * | 9/2005 | Monti | 198/426 |
| 7,210,280 B2 * | 5/2007 | Cottone et al. | 198/426 |

* cited by examiner

*Primary Examiner*—James R. Bidwell
(74) *Attorney, Agent, or Firm*—Marger Johnson & McCollom, PC

(57) ABSTRACT

A block sorting system includes a block transferring apparatus that has a plurality of independently movable opposing pairs of gripping members. The gripping members pick up the row of blocks on a staging conveyor and move the row of blocks laterally to a set of adjacent sorting conveyors. A sensor apparatus measures the length and width of each block in the row of blocks while the row of blocks is laterally translated to the sorting conveyors. The independently controlled gripping members release a first set of blocks having a first length and width onto a first sorting conveyor. The remaining blocks are translated over a second sorting conveyor and a second set of blocks having a second length and width are released onto the second sorting conveyor. Rejected blocks may be translated laterally to a container and released into the container.

30 Claims, 4 Drawing Sheets

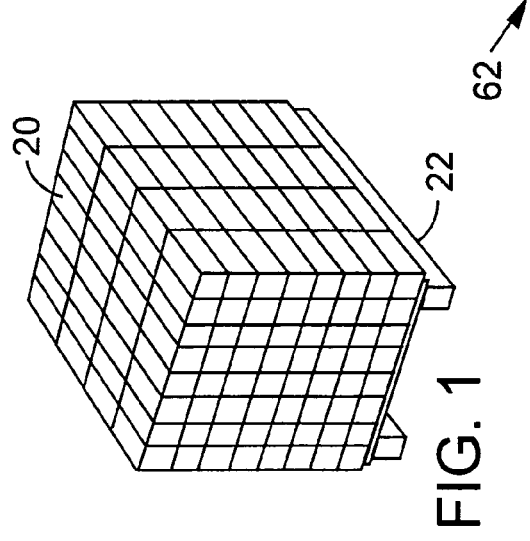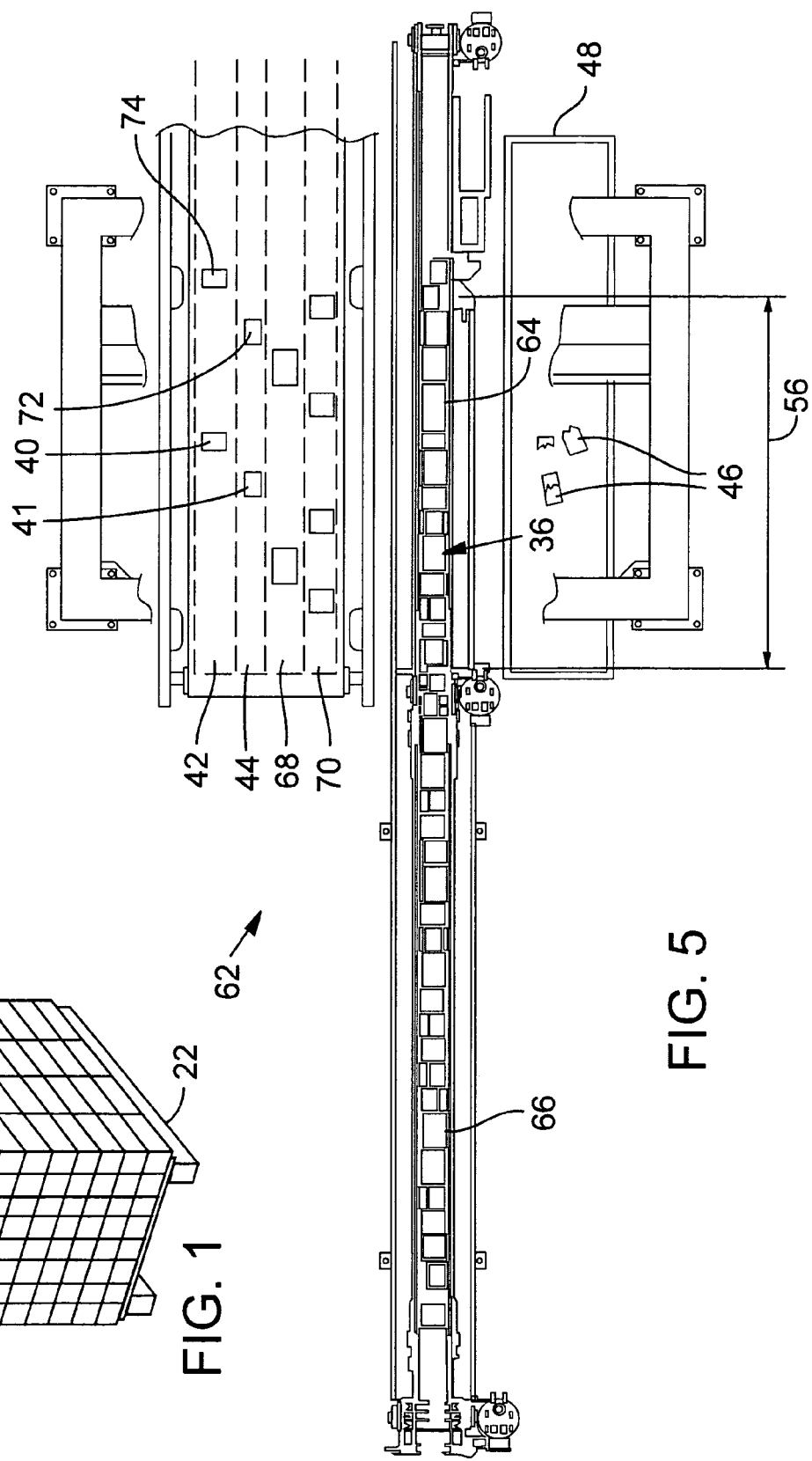

BLOCK SORTING SYSTEM AND METHOD

BACKGROUND OF THE INVENTION

1. Field of the Invention

This disclosure relates to the sorting of blocks and more particularly to the sorting of paving blocks in preparation for shipping.

2. Background of the Invention

Blocks of various sizes and composition are used for paving plazas, roads, sidewalks and are used for many other purposes. The blocks are made from concrete, stone, brick, marble, earthenware tiles and other materials. While blocks are made in many different sizes and shapes, this disclosure relates to blocks that are manufactured or cut in generally parallelepided shapes.

Block manufacturers typically stack blocks 20 on a palette 22 to ship the blocks 20 to customers as is shown in FIG. 1. After the blocks 20 are stacked, the stack and palette 22 are wrapped in plastic or by straps to keep the stack in place during shipping. Orders for blocks from the manufacturer typically include various amounts of differing sized blocks.

To increase efficiency of building a stack of blocks 20 as shown in FIG. 1, a manufacturer sorts the different sized blocks before sending the blocks to a stacking machine, throwing away any rejected blocks. Manually sorting these blocks 20 is time consuming, which increases the cost of production of the blocks.

What is needed is a more automated way to sort a group of blocks by size before sending the blocks to a stacking machine.

BRIEF DESCRIPTION OF THE DRAWINGS

FIG. 1 is a perspective view of a typical stack of blocks on a palette.

FIG. 5 is a top plan view of a block sorting system according to another embodiment of the invention.

DETAILED DESCRIPTION

Disclosed herein is an apparatus for transferring a lengthwise row of blocks and sorting the blocks by depositing blocks of a similar size within that row of blocks at predetermined lateral positions. Also disclosed herein are a system and a method for transferring and sorting varying sizes of blocks.

By using a transferring apparatus that includes a plurality of independently controlled pairs of movable gripping members and a measuring device that quickly measures the length and width of each block in a row, an unsorted row of blocks can be picked up from a staging area and translated to sorting conveyors with blocks of similar size being dropped onto the corresponding sorting conveyor.

Figure 2:
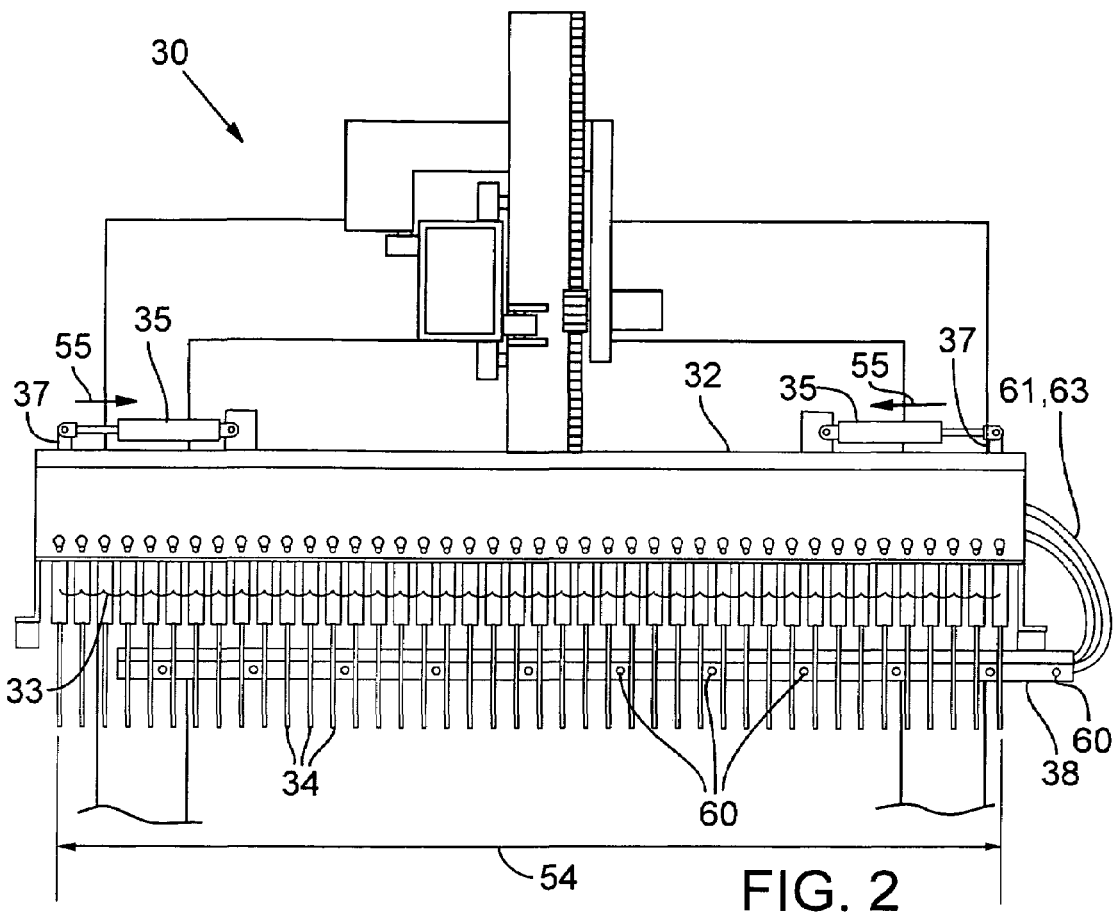
FIG. 2 is a side elevation view of a multiple block transferring apparatus according to an embodiment of the invention.
Figure 3:
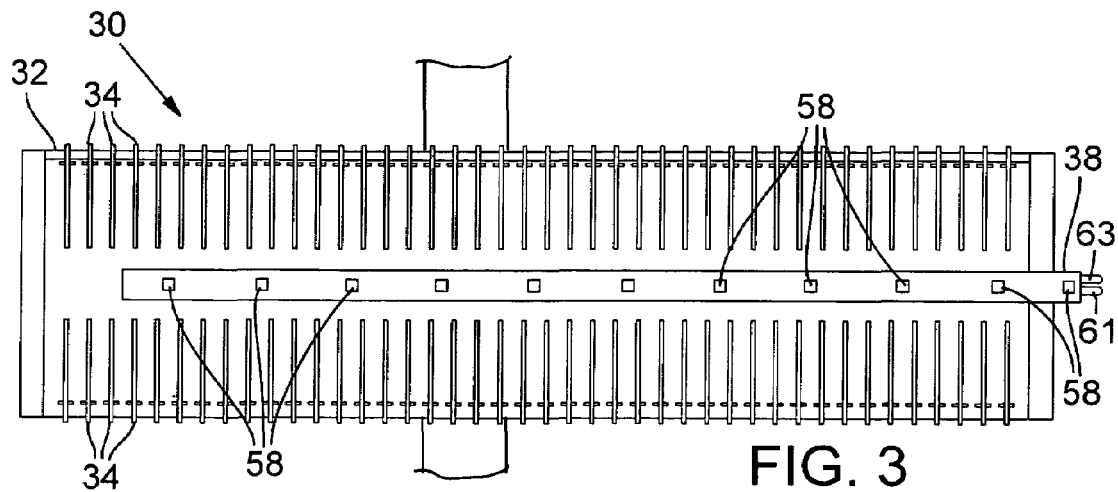
FIG. 3 is a bottom plan view of the block transferring apparatus in FIG. 2.
Figure 6:
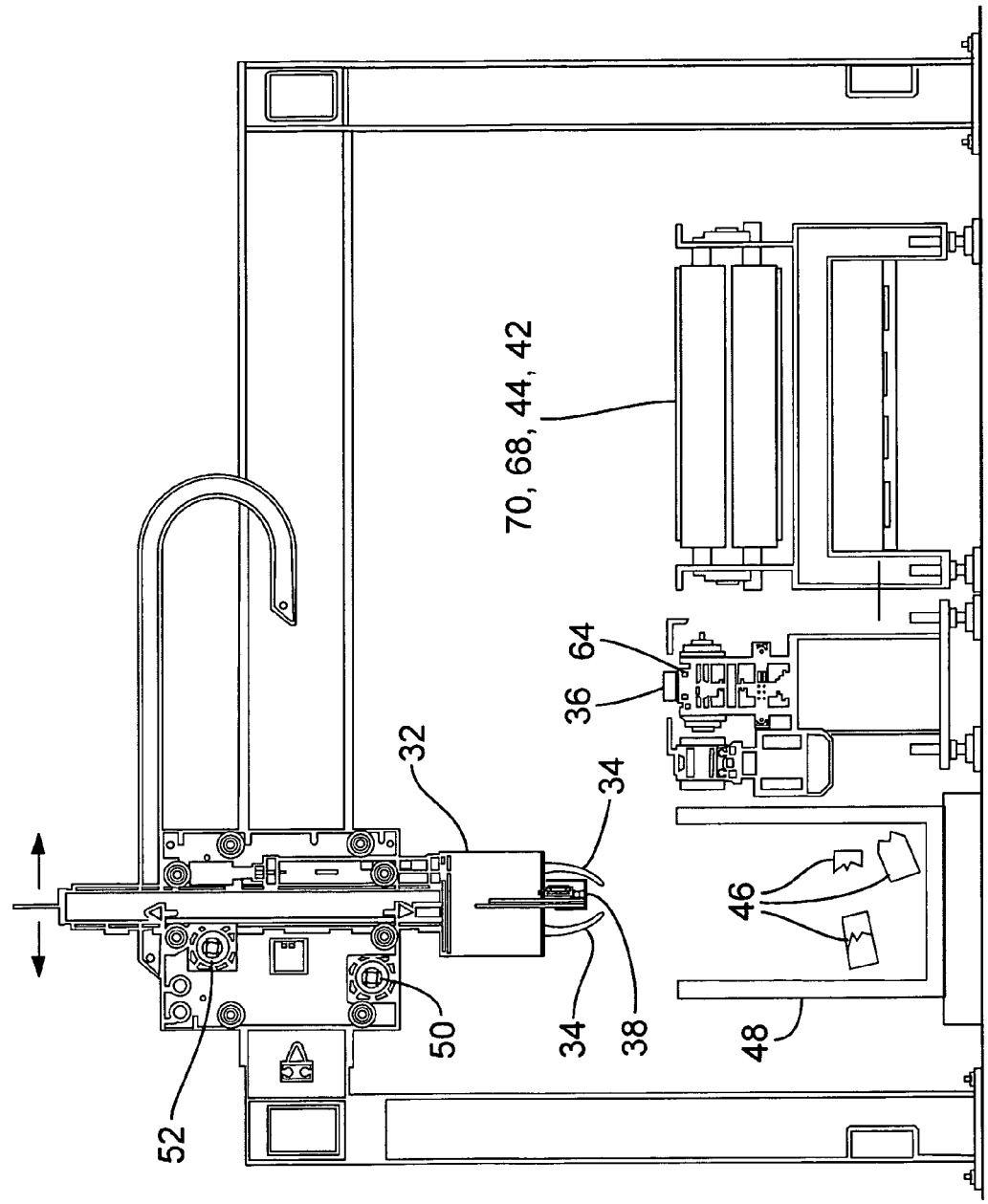
FIG. 6 is an end elevation view of the block sorting system in FIG. 5.

FIG. 2 is a side elevation view of a multiple block transferring apparatus 30 and FIG. 3 is a bottom plan view of the block transferring apparatus 30. Referring to FIGS. 2 and 3, the apparatus housing 32 includes a plurality of independently controlled pairs of movable opposing gripping members 34. These pairs of gripping members 34 are arrayed along a length of a bottom of the apparatus housing 32 and are arranged to grip a lengthwise row of blocks 36, as shown in FIGS. 5 and 6.

The transferring apparatus 30 also has a sensor apparatus 38 that is arranged on the apparatus housing 32 to move in a lengthwise direction along the apparatus housing 32. The sensor apparatus 38 is structured to measure the length and width of each block in the lengthwise row of blocks 36.

As will be further explained, the transferring apparatus 30 is movable to different positions. The pairs of gripping members 34 may be controlled independently to release a first set of blocks 40 that each have a first length and width at a first position 42, as shown in FIG. 5. The pairs of gripping members 34 may be further controlled independently to release a second set of blocks 41 that each has a second length and width at a second position 44, as shown in FIG. 5. Further, the pairs of gripping members 34 may be independently controlled to release a set of rejected/broken blocks 46 at third position 48. The first position may be a first sorting conveyor 42, the second position may be a second sorting conveyor 44 and the third position may be a rejected block container 48.

While sorting conveyors 42 and 44 are described above as being separate conveyors, the conveyors 42, 44 may be separate channels arranged over a single conveyor belt.

As shown in FIG. 5, more than two sorting conveyors may be used and the block transferring apparatus 30 can sort as many sets of blocks as there are available sorting conveyors because the pairs of gripping members 34 are controlled independently.

Referring to FIG. 6, the block transferring apparatus 30 includes a first motor 50 arranged to move the apparatus housing 32 laterally and a second motor 52 arranged to move the apparatus housing 32 vertically. The first and second motors 50, 52 may be brushless motors with controlled axes.

Referring to FIGS. 2 and 5, the pairs of gripping members 34 may be arrayed such that a distance 54 from a first pair to a last pair is less than the length 56 of the lengthwise row of blocks 36. This spacing ensures that all pairs of gripping members 34 will be in contact with the row of blocks 36.

Each pair of the gripping members 34 is independently controlled and may have its lengthwise position be adjustable. Referring to FIG. 2, a toothed belt 33 with a steel core links the individual gripping members 34 to each other along the length of the apparatus housing 32. Actuators 35 on top of the apparatus housing 32 are linked to the toothed belt 33 by linkage arms 37. Before the gripping members 34 grip the row of blocks 36, the belt 33 is slack. After gripping the blocks 36, the actuators 35 are activated, moving in opposite directions 55, 57 toward each other, causing the belt 33 to tighten thereby fanning the gripping members 34 out along the length. This lengthwise adjustability allows the pairs of members 34 to move each of the blocks lengthwise to space the blocks apart from each other. Spacing the blocks apart may help the sensor apparatus 38 more easily distinguish between blocks in the row of blocks 36.

The pairs of gripping members 34 may be pneumatically controlled and activated. Pneumatic control allows for quick control response time. As shown in FIG. 2, the pairs of gripping members 34 may be forty-eight pairs of gripping members 34 which enable the pairs of members 34 to more finely control the gripping, lengthwise spacing and releasing of blocks. Using more than forty-eight pairs of gripping members 34 results in even finer control, however, cost-effectiveness may place an upper limit on the number of pairs.

Figure 4:
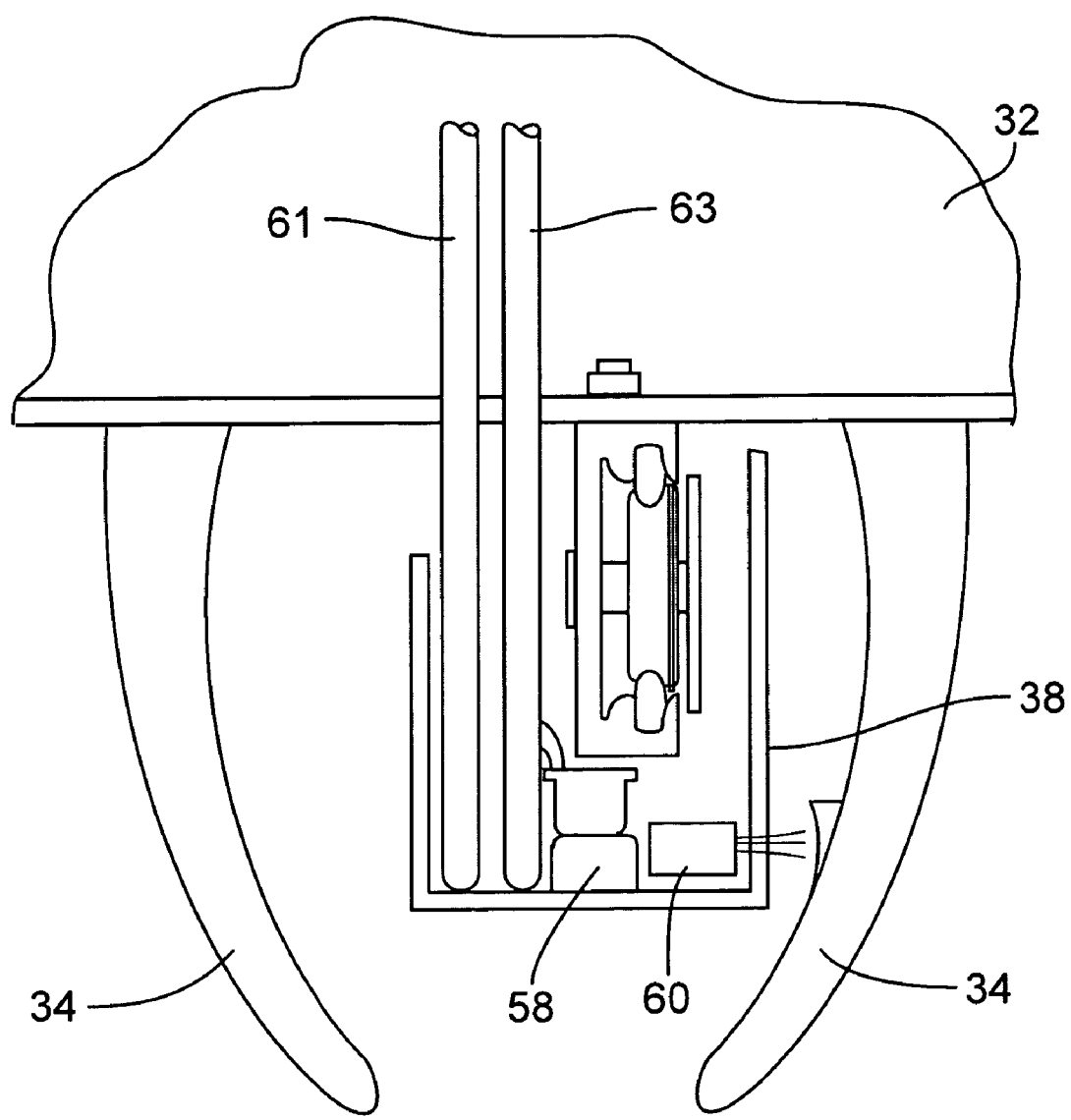
FIG. 4 is a detailed end view of a sensor apparatus in the block transferring apparatus in FIG. 1.

FIG. 4 is a detailed end view of the apparatus housing 32 showing an end of the sensor apparatus 38, sensor 58 and sensor 60. The sensor apparatus 38 may have a plurality of sensors 58 arrayed along a length of the sensor apparatus, as shown in FIG. 3, to more easily measure the length of each block in the row of blocks 36. The plurality of sensors 58 may be scanning photocells arranged to scan the length of each block.

The sensor apparatus may also have a plurality of sensors 60 also arrayed along a length of the sensor apparatus, as shown in FIG. 2, to more easily measure the width of each block in the row blocks 36. The sensors 60 may be ultrasonic sensors that measure the open/close position of each gripping member 34, which is used to determine the width of each block.

The sensor apparatus may further be structured to translate along a length of the bottom of the housing apparatus 32. By having pluralities of sensors 58, 60 arrayed along the length of the sensor apparatus 38, the sensor apparatus 38 may move a portion of the length of the bottom of the housing apparatus 32 to measure the length and width of each block in the row of blocks 36. Because the sensor apparatus 38 may translate a portion of that length, which may be about 250 mm, the measuring of all the blocks in the row of blocks 36 may be accomplished in about 0.5 seconds. Thus, the measurement of each block can be accomplished while the housing apparatus 32 moves from a position over row 36 to position 42 to release the first set of blocks 40.

The sensors 58, 60 communicate the measurements to a processor (not shown) through wires 61, 63. The processor uses the data from the sensors 58, 60 to control the opposing gripping members 34 to release selected blocks from the row of blocks 36.

FIG. 5 is a top plan view of a block transferring and sorting system 62 and FIG. 6 is an end elevation view of the system 62. A staging conveyor 64 is structured to stage a predetermined length 56 of generally rectangular blocks 36 in a single lengthwise row. A feeding conveyor 66 feeds the single row of blocks 36 onto the staging conveyor 64.

A plurality of sorting conveyors 42, 44, 68, 70 are positioned adjacent each other and positioned as a group lateral to the staging conveyor 64. Each sorting conveyor 42, 44, 68, 70 is structured to receive a set of blocks lengthwise. While sorting conveyors 42, 44, 68, 70 are described as being separate conveyors, the conveyors may be separate channels arranged over a single conveyor belt.

The block transferring apparatus 30 includes a plurality of independently movable opposing pairs of gripping members 34 that are arrayed along a length of the bottom of the transferring apparatus 30, as shown in FIG. 2. The pairs of gripping members 34 are structured to grip the length of blocks 36 on the staging conveyor 64.

A sensor apparatus 38 in the transferring apparatus 30 is structured to measure the length and width of each block in the length of blocks.

The transferring apparatus 30 further includes a first motor 50 to move the apparatus laterally and a second motor 52 to move the apparatus vertically. The second motor 52 allows the transferring apparatus 30 to pick the length of blocks 35 up off of the staging conveyor 64. The first motor 50 allows the transferring apparatus 30 to move the blocks over to the sorting conveyors 42, 44, 68, 70 and move the transferring apparatus back to the staging conveyor 64 to pick up a next length of blocks.

The plurality of pairs of gripping members 34 are independently controlled so that they can release a first set of blocks 40 onto the first conveyor 42. A processor (not shown) utilizes the data from the sensor apparatus 38 and then sends control signals to independently operate each of the opposing pairs of gripping members 34. The first set of blocks 40 is preferably a set of similar or same length and width blocks. The independent control of the pairs of gripping members 34 then allows a second set of blocks 41 to be released onto the second conveyor 44. The independent control of the pairs of gripping members 34 also allows rejected blocks 46 to be released into a rejected block container 48. To speed up the sorting and transferring operation, the rejected block container 48 may be positioned laterally adjacent to the staging conveyor 64.

The sets 40, 41 may include a number of blocks fewer than the total number of blocks in the length of blocks 36. The blocks within a given set do not have to be adjacent to each other in the length of blocks 36. The gripping members 34 can further release third and fourth sets of blocks 72, 74 onto the third and fourth sorting conveyors 68, 70.

Referring to FIGS. 2-6, a method of transferring and sorting blocks will be described. A length of blocks 36 is conveyed onto a staging conveyor 64 by feeding conveyor 66 which feeds the lengthwise row of blocks 36 to the staging conveyor 64.

Block transferring apparatus 30 is lowered over the length of blocks 36 and the plurality of opposing pairs of gripping members 34 are activated to close and grip the length of blocks 36. The block transferring apparatus is then lifted to translate the length of blocks 36 vertically off of the staging conveyor 64 and then moved laterally to laterally translate the length of blocks 36 toward the first sorting conveyor 42.

A length and width of each block in the length of blocks 36 is measured by the sensor apparatus 38 while the length of blocks 36 is being laterally translated to the first sorting conveyor 42. The measuring of all the blocks in the length of blocks 36 preferably takes place within about 0.5 seconds thereby finishing the measuring process before the transferring apparatus 30 reaches the first sorting conveyor 42. The length of each block may be measured by the plurality of sensors 58, which may be scanning photocells. The width of each block may be measured by the plurality of sensors 60, which may be ultrasonic sensors that measure the position of each gripping member 34 on a given side to determine the width of the block being held by that member.

A first set of blocks 40 having a first length and width are released at the first sorting conveyor 42. The remaining blocks from the length of blocks 36 are then translated laterally to the second sorting conveyor 44 at which a second set of blocks 41 having a second length and width are released. The same may be repeated for the third and fourth sorting conveyors 68, 70 and sets of blocks 72, 74.

As described above, the sets of blocks 40, 41, 72 and 74 may include a number of blocks less than the total number of blocks in the length of blocks 36 and the blocks within each set do not have to be adjacent each other within the length of blocks 36.

Any rejected blocks 46 remaining in gripping members 34, such as blocks that are broken or out of size tolerance, are then translated laterally to the rejection container 48 and released at that point. The transferring apparatus 30 then returns to the staging conveyor 64 to repeat the process.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and sub-combinations of the various elements, features, functions and/or properties disclosed herein.

The invention claimed is:

1. A multiple block transferring apparatus comprising:
   an apparatus housing;
   a plurality of pairs of independently movable opposing gripping members arrayed along a length of a bottom of the apparatus housing, structured to grip a lengthwise row of blocks; and
   a sensor apparatus arranged to travel lengthwise and structured to measure a length and width of each block in the row of blocks,
   wherein the plurality of gripping members are structured to release a first set of blocks having first predetermined length and width criteria at a first predetermined position, responsive to the measured length and width of each block.

2. The apparatus of claim 1, further comprising a first motor arranged to move the apparatus housing vertically and a second motor arranged to move the apparatus housing laterally.

3. The apparatus of claim 2, wherein the first and second motors are brushless motors with controlled axes.

4. The apparatus of claim 1, wherein the plurality of gripping members are structured to release a second set of blocks having second predetermined length and width criteria at a second predetermined position.

5. The apparatus of claim 4, wherein the plurality of gripping members are structured to release a set rejected blocks at a third lateral position.

6. The apparatus of claim 1, wherein the plurality of pairs of movably opposing gripping members arrayed along a length of a bottom of the apparatus housing are arrayed such that a distance from a first pair to a last pair is less than a length of the lengthwise row of blocks.

7. The apparatus of claim 1, wherein the plurality of pairs of movably opposing gripping members arrayed along a length of a bottom of the apparatus housing are positionally adjustable along the length of the bottom of the apparatus housing.

8. The apparatus of claim 7, wherein the plurality of pairs of gripping members are positionally adjustable such that a lengthwise distance between each of the pairs is equal.

9. The apparatus of claim 1, wherein the plurality of pairs of gripping members are pneumatically operable.

10. The apparatus of claim 1, wherein the plurality of pairs of gripping members is 48 or more pairs of gripping members.

11. The apparatus of claim 1, wherein the sensor apparatus has a first plurality of sensors arranged to measure a length of each block in the lengthwise row of blocks and has a second plurality of sensors arranged to measure a width of each block in the lengthwise row of blocks.

12. The apparatus of claim 11, wherein the sensor apparatus is structured to translate a portion of the length of the bottom of the housing apparatus to measure the length and width of each block in the lengthwise row of blocks.

13. The apparatus of claim 12, wherein the sensor apparatus is structured to translate a portion of the length of the bottom of the housing apparatus in about 0.5 seconds.

14. The apparatus of claim 12, wherein the sensor apparatus is structured to translate about 250 mm to measure the length and width of each block in the lengthwise row of blocks.

15. The apparatus of claim 11, wherein the first plurality of sensors are scanning photocells and the second plurality of sensors are ultrasonic sensors.

16. A block transferring and sorting system comprising:
   a staging conveyor structured to stage a predetermined length of generally rectangular blocks in a single lengthwise row;
   a plurality of sorting conveyors positioned adjacent each other and positioned lateral to the staging conveyor, each sorting conveyor structured to receive a set of the blocks lengthwise; and
   a block transferring apparatus that has:
      a plurality of pairs of movably opposing gripping members arrayed along a length of a bottom of the block transferring apparatus and arranged to grip the length of blocks on the staging conveyor,
      a sensor apparatus structured to measure a length and width of each block in the length of blocks,
      a first motor to move the apparatus vertically,
      a second motor to move the apparatus laterally,
      wherein the plurality of pairs of gripping members is structured release a first set of blocks from the length of blocks onto a first sorting conveyor.

17. The system of claim 16, wherein the plurality of pairs of gripping members are structured to release a second set of blocks from the length of blocks onto a second sorting conveyor.

18. The system of claim 17, wherein the first and second sorting conveyors are structured to be energy absorbing to stabilize blocks released from the block transferring apparatus.

19. The system of claim 16, further comprising a rejected block container,
   wherein the plurality of pairs of gripping members are structured to release a set of rejected blocks into the rejected block container.

20. The system of claim 19, wherein the rejected block container is positioned laterally adjacent to the staging conveyor.

21. The system of claim 16, wherein the sensor apparatus is structured to translate a portion of the length of the bottom of the block transferring apparatus to measure the length and width of each block in the length of blocks.

22. The system of claim 21, wherein the sensor apparatus is structured to translate a portion of the length of the bottom of the block transferring apparatus in about 0.5 seconds.

23. The system of claim 21, wherein the sensor apparatus is structured to translate about 250 mm.

24. A method of transferring and sorting blocks comprising:
   conveying a predetermined length of blocks in a lengthwise row to a staging area;
   gripping the length of blocks with a plurality of pairs of movably opposing gripping members;
   translating the length of blocks vertically and laterally;
   measuring a length and a width of each block in the length of blocks while translating the length of blocks laterally;

releasing a first set of blocks from within the length of blocks having first length and width criteria at a first lateral position.

25. The method of claim 24 further comprising spacing the blocks in the length of blocks apart lengthwise and centering the blocks laterally before translating the blocks laterally.

26. The method of claim 24, further comprising releasing a second set of blocks from within the length of blocks having second length and width criteria at a second lateral position.

27. The method of claim 26, further comprising stabilizing the first and second set of blocks at the first and second lateral positions.

28. The method of claim 26, further comprising releasing a set of rejected blocks from within the length of blocks at a third lateral position.

29. The method of claim 26, wherein the first lateral position is a first sorting conveyor and the second lateral position is a second sorting conveyor.

30. The method of claim 24, wherein measuring a length and a width of each block in the length of blocks includes measuring the length and width of each block in the length of blocks within about 0.5 seconds.

* * * * *